USOO5557912A

United States Patent [19]
Voss et al.

[11] Patent Number: 5,557,912
[45] Date of Patent: Sep. 24, 1996

[54] STRIPPER HEADER ATTACHMENT

[75] Inventors: Douglas A. Voss, Brantford; David G. Link, Cayuga; David S. Rea, Slave Lake; Murray W. Mills, Brantford, all of Canada

[73] Assignee: Western Combine Corporation, Guelph, Canada

[21] Appl. No.: 489,963

[22] Filed: Jun. 13, 1995

[51] Int. Cl.⁶ .............................. A01D 41/06; A01F 12/10
[52] U.S. Cl. ................................................ 56/130; 56/364
[58] Field of Search ............................ 56/130, 126, 364, 56/128, 127, 129

[56] References Cited

U.S. PATENT DOCUMENTS

| | | | |
|---|---|---|---|
| 4,790,128 | 12/1988 | Klinner | 56/364 |
| 4,843,806 | 7/1989 | Klinner | 56/364 |
| 4,951,453 | 8/1990 | Klinner | 56/364 |
| 4,991,385 | 2/1991 | Klinner | 56/364 |
| 5,044,147 | 9/1991 | Klinner | 56/14.7 |
| 5,111,645 | 5/1992 | Klinner | 56/364 |
| 5,175,984 | 1/1993 | Hale et al. | 56/130 |
| 5,185,991 | 2/1993 | Klinner | 56/128 |
| 5,199,248 | 4/1993 | Hale et al. | 56/102 |
| 5,299,413 | 4/1994 | Gale | 56/10.2 |
| 5,419,107 | 5/1995 | Shelbourne et al. | 56/130 |

FOREIGN PATENT DOCUMENTS

1648275   5/1991   U.S.S.R. .................... 56/128

*Primary Examiner*—Terry Lee Melius
*Attorney, Agent, or Firm*—Reising, Ethington, Barnard & Perry

[57] ABSTRACT

The stripper header attachment (10) has a stripping rotor (64) and an auger (116). A formed cut-off feed plate (82) feeds heads, grain and other plant residue stripped from stalks to the auger (116). To improve feeding, a smooth roller (102) extends up through a slot (100) in the feed plate (82). A front seal (104) and a rear seal (106) prevent grain loss between the smooth roller and the sides of the slot (104). A three speed gear box (170) drives the stripping rotor (64) and smooth roller (102). A front hood (144) is pivoted about the axis of the stripping rotor by the hood adjustment cylinder (150) to adjust the height of the nose portion (146). Auger housing covers (162) with screens (168) are pivotally attached to the rear hood (158) and enclose the auger housing.

11 Claims, 7 Drawing Sheets

STRIPPER HEADER ATTACHMENT

TECHNICAL FIELD

This invention is in a header attachment for a combine harvester and more particularly in a stripper header which strips seeds and seed-holding parts from the stems of standing crops, collects the seeds and seed-holding parts and feeds the collected material to the threshing, separating and cleaning mechanisms in the combine.

BACKGROUND OF THE INVENTION

Combine harvesters used today for harvesting grain crops in most parts of the world are designed to harvest a number of different seeds and cereal grains. They harvest grass seeds, canola, soybeans, corn, barley, oats, rice, wheat and many more crops. These crops are normally harvested by severing a substantial portion of the plant that extends upward from the ground and root system. The severed plant material is then gathered and conveyed into a combine harvester for threshing, separation of grain and cleaning of grain.

The seeds or grain kernels of many crops are found at the very top portion of the plant in heads supported by stalks. Because there is some variation in the heights of the heads from one stalk to another it is necessary to sever a substantial portion of the stalks to insure that substantially all the heads are recovered and that few are lost. Severing heads with a substantial portion of the stalks attached substantially increases the volume of material that is delivered to the threshing, separating and cleaning mechanisms.

The capacity of a combine harvester is generally limited by two primary factors. One limiting factor is the speed at which crop material can be severed and gathered. Another limiting factor is the rate at which the gathered crop material can be threshed and the grain can be separated and cleaned. For most harvesting systems the rate at which crops can be harvested is limited by the machines ability to thresh, separate and clean the grain. The ability to thresh, separate and clean is reduced in heavy crop conditions when handling large quantities of straw. National Research Development Corporation of England has developed stripper headers, shown in U. S. Pat. No. 5,111,645 to Klinner. The Klinner stripper header strips heads and grain from stalks or straw and conveys the stripped heads and grain to a threshing mechanism. The stalks or straw are for the most part left attached to their roots and standing upright. Only the heads and grain are gathered and fed to the threshing mechanism. The Klinner stripper header eliminates the crop cutting device and substantially reduces the quantity of straw or stalks that is conveyed to the threshing mechanism. Reducing the quantity of straw or stalks passing into the threshing mechanism substantially reduces the time required to harvest, thresh, separate and clean a crop. A stripper header thereby reduces the time required to harvest a crop. The end result is that a crop can be harvested in less time or the crop can be harvested with fewer machines.

The stripper header works well in many crops and in a wide range of crop conditions. However, grain losses can occur. The stripping rotor may fail to completely strip the heads and grain or the heads and grain that are detached by the stripping rotor may be lost. The stripper header may also convey stripped heads and grain unevenly to the threshing mechanism. Uneven feed of heads and grain to the threshing mechanism can reduce the efficiency of the threshing system and result in grain loss. In extreme conditions uneven feeding and bridging of material may cause plugging in the stripper header, or threshing components.

SUMMARY OF THE INVENTION

An object of the invention is to provide a stripper header attachment that feeds mainly heads and grain continuously from the stripping rotor to the header discharge opening without blockages.

Another object of the invention is to reduce grain loss from a stripper header.

A further object is to provide a stripper header with adjustments that can be made easily and quickly.

The stripper header attachment of this invention has a rotor with radially extending stripping elements that strip heads and grain from standing plants and leaves the stalks or straw standing in the field. A front hood pivots about the axis of rotation of the rotor and is held in a position in which its front edge contacts the upper portion of the crop material and pushes the upper portion of the plants in the direction of forward movement of the harvester relative to the plant roots. Stripping action of the rotor is enhanced by slightly orienting the plants away from the rotor. A rear hood cooperates with the front hood to direct heads and grain stripped by the stripping rotor into an auger conveyor. The front hood and the rear hood can be pivoted into positions in which the front or rear of the stripping rotor is exposed for inspection and maintenance.

A formed feed plate is provided between the stripping rotor and an auger conveyor. The feed plate helps separate stripped heads and grain from the stripping rotor and guides the stripped heads and grain into an auger conveyor trough. A transfer roller conveyor is provided with a portion of its upper surface projecting upwardly through a slot in the feed plate. The roller is rotated in a direction to positively transfer heads and grain toward the auger conveyor. Seals are provided at front and rear edges of the slot in the feed plate to prevent the loss of grain and heads between the roller and the edges of the slot in the feed plate.

An auger conveyor receives heads and grain from the roller conveyor and feed plate, conveys the heads and grain transversely toward the center of the auger trough and then discharges the heads and grain rearwardly from the header attachment.

A screen cover is provided over the top of the auger trough. The screen permits the discharge of air that is propelled toward the auger conveyor by the stripping rotor. Heads and grain that are propelled rearwardly and upwardly from the stripping rotor are caught by the screen and deflected toward the auger conveyor. The screen covers permit the operator to visually monitor performance of the auger conveyor and detect any potential blockages. Individual sections of the screen cover can be pivoted upwardly and forwardly for inspection and maintenance of the auger conveyor, the feed plate and the roller conveyor.

The stripping rotor is driven by a gear box that is powered by the combine harvester to which the stripper header is attached. The gear box has three gear ratios to drive the stripping rotor at three different speeds. The roller conveyor is driven by the stripper rotor. The auger conveyor is driven by the transmission input shaft at a substantially constant speed. Auger speed does not change when the gear box is shifted to a different ratio to change the stripping rotor speed.

The foregoing and other objects, features and advantages of the present invention will become apparent in the light of the following detailed description of an exemplary embodiment thereof, as illustrated in the accompanying drawing.

DESCRIPTION OF THE PREFERRED EMBODIMENT

Figures 1, 2:
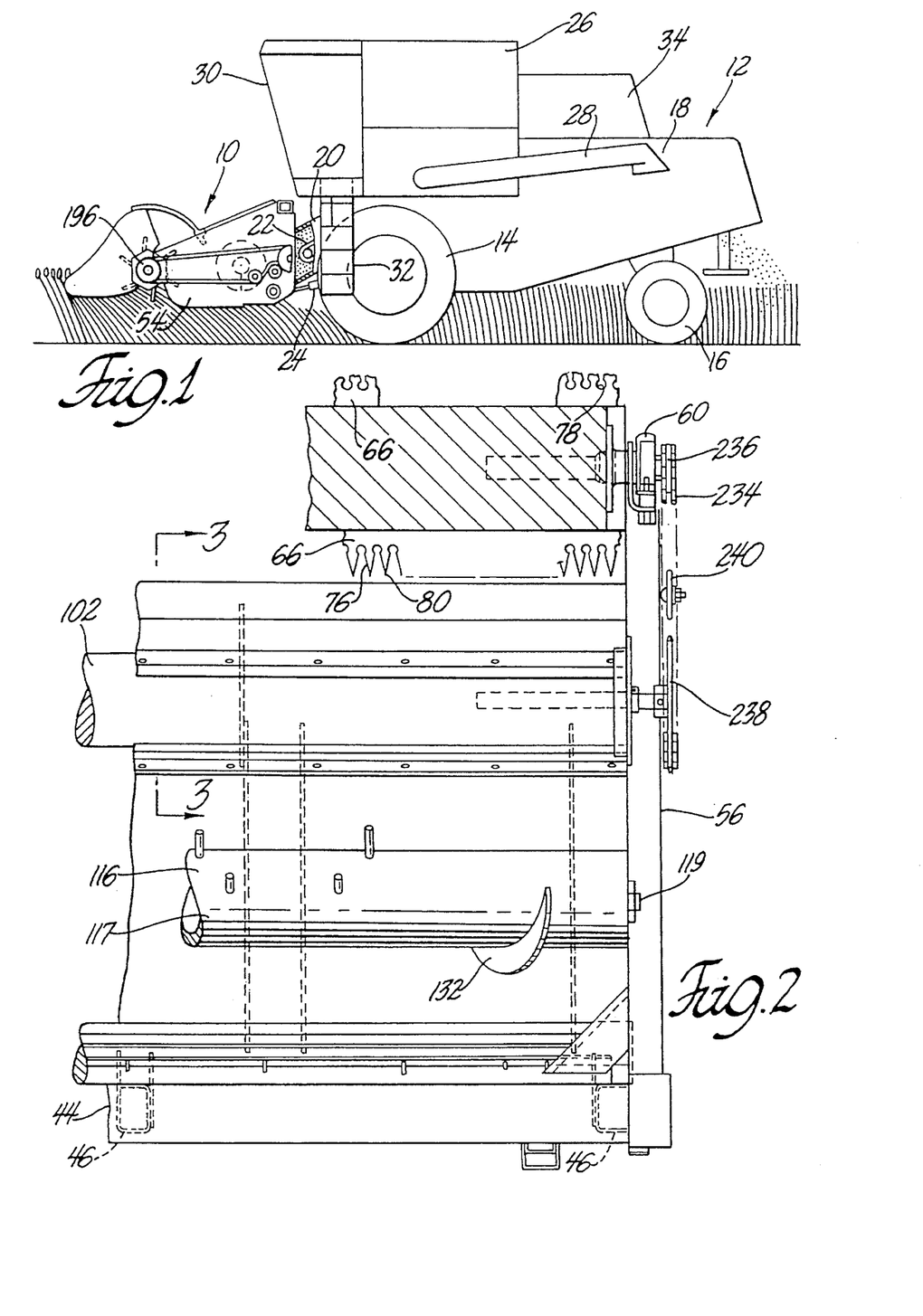
FIG. 1 is a schematic side elevational view of a combine harvester and the stripper header attachment with parts broken away.
FIG. 2 is a top plan view of the right end of the stripper header attachment with some parts broken away and with the front hood, the rear hood and the auger housing cover removed.

The stripper header attachment 10 is shown in FIG. 1 attached to a combine harvester 12. The combine harvester 12 has two driven front wheels 14 and two steered rear wheels 16. A separator housing 18 supported by the wheels 14 and 16 houses a threshing assembly, a separating assembly and a cleaning assembly. A feeder elevator housing 20 is pivotally attached to the front of the separator housing 18 and houses a conveyor 22 that elevates and conveys crop material from the stripper header attachment 10 to the threshing assembly in the separator housing 18. Hydraulic cylinders 24 attached to the separator housing 18 and the forward bottom portion of the elevator housing 20, pivot the elevator housing 20 relative to the separator housing 18 to raise and lower the stripper header attachment 10. The threshing assembly can be a rasp bar cylinder and concave that tangentially receives crop material from the elevator housing 20. Such a threshing assembly is referred to as conventional. The threshing assembly can also be one of more recent design in which crop material is moved in a direction generally parallel to the axis of rotation of the threshing rotor and follows a helical path. After threshing, the grain is separated from other crop material and cleaned. Clean grain is elevated to a grain tank 26 for temporary storage. When the grain tank 26 is filled, an unloading auger 28 conveys grain from the grain tank 26 to a truck or trailer. The unloading auger 28 is in a transport or storage position as shown in FIG. 1. An operator's work station and cab 30 is mounted on the separator housing 18 in front of the grain tank 26. The cab 30 has windows that provide good visibility to the front and to both sides. A ladder 32 provides operator access to the cab. An engine compartment 34 houses an internal combustion engine which drives the harvesting, threshing, separating and cleaning mechanisms and also powers the driven front wheels 14 and stripper header attachment 10.

Figure 5:
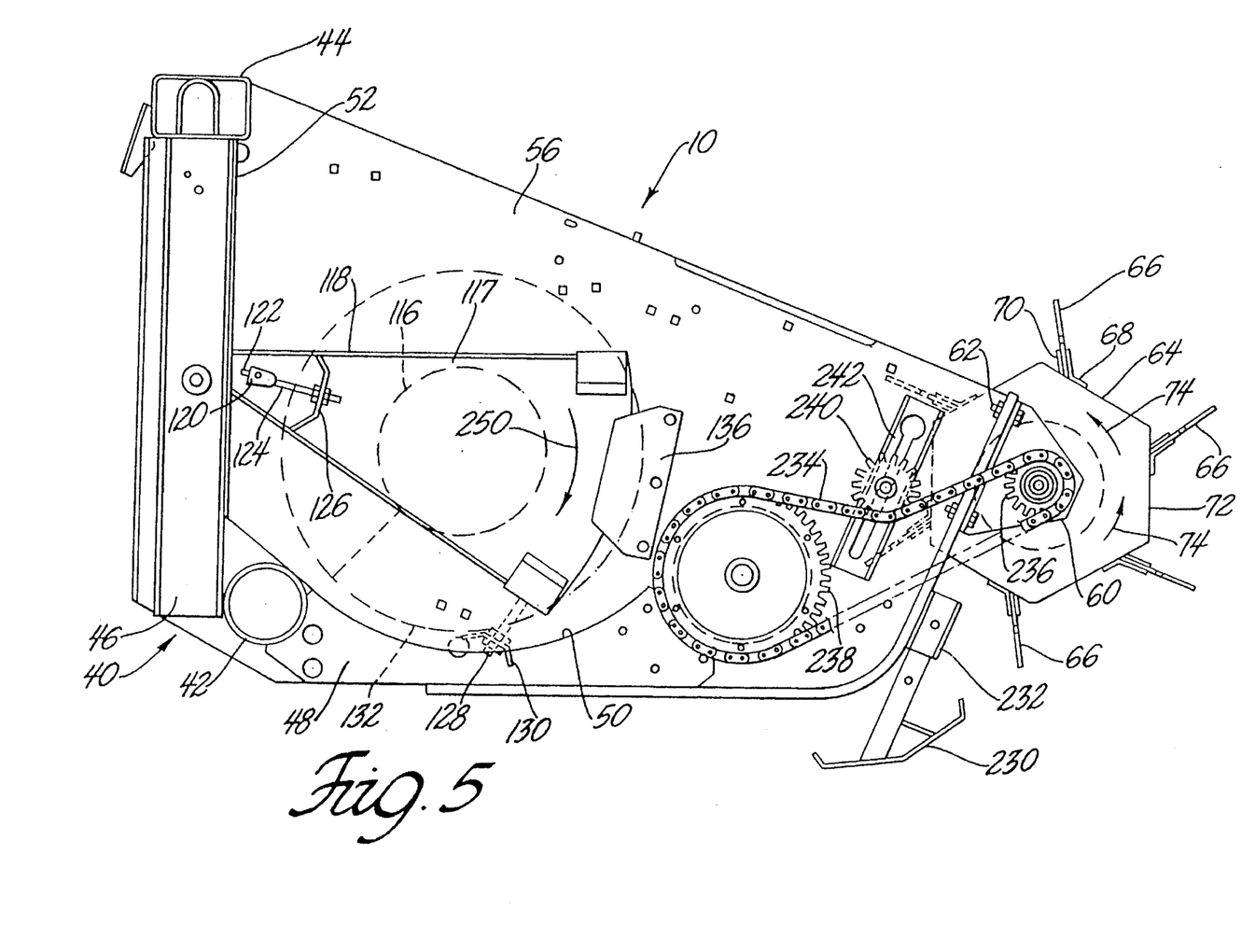
FIG. 5 is an enlarged right side elevational view showing the roller drive.

The stripper header attachment 10 has a frame 40, as shown in FIG. 5, with a lower torque tube 42, an upper beam 44 and generally vertical channels 46 welded to the lower torque tube and the upper beam. The upper beam 44 is a rectangular tube. Header attachments for large combine harvesters are twenty to thirty feet wide or possibly wider. The frame 40 must therefore be structurally sound. A number of ribs 48 are welded to and extend forward from the torque tube 42. An auger trough 50 is attached to the top of the ribs 48 and extends substantially the width of the stripper header attachment 10. A rear wall 52 of the header attachment is attached to the front side of the vertical channels 46 and extends upward from the auger through 50 to the upper beam 44.

Figure 6:
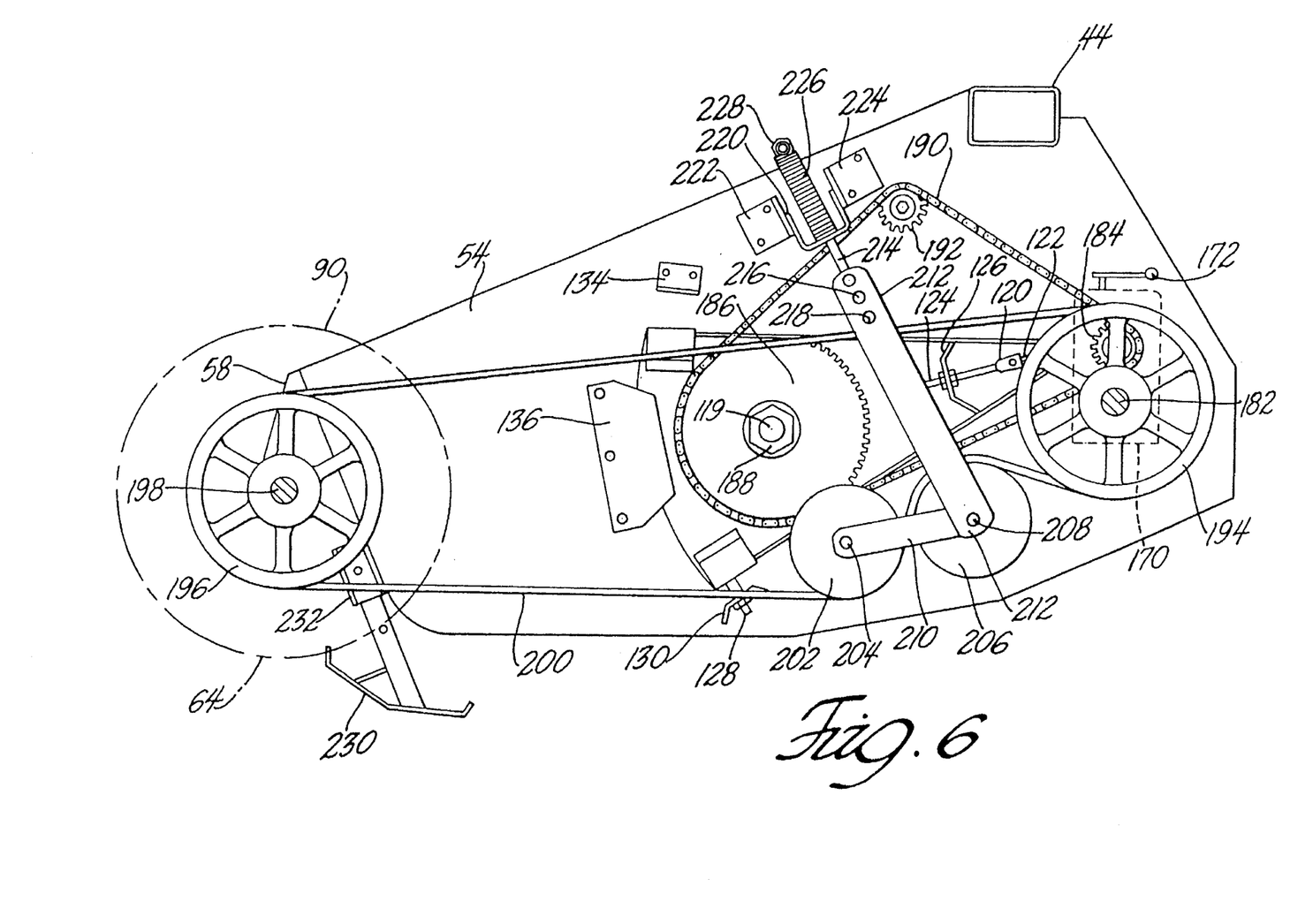
FIG. 6 is an enlarged left side elevational view showing the stripping rotor drive and the auger drive with the front hood, the rear hood and the auger housing cover removed.

An end sheet assembly 54, shown in FIG. 6, is attached to the end of the lower torque tube 42, the end of the upper beam 44 and the end of the auger trough 50. An end sheet assembly 56, shown in FIG. 5, is similarly attached to the end of the lower torque tube 42, the end of the upper beam 44 and the end of the auger trough 50. The left and right end sheet assemblies 54 and 56 are vertical and extend forward from the lower torque tube 42 and the upper beam 44. A stripping rotor 64 is rotatably journaled in bearings in bearing blocks 58 and 60 attached to the end sheet assemblies 54 and 56 by bolts 62. The stripping rotor 64 is fabricated from two plates into a hexagon shaped drum 72. Stripping elements 66 are clamped between angle members 68 and flat members 70 and attached to each of the six sides that form the hexagon shaped drum 72. The stripping elements 66 are placed end to end so that they extend the entire length of each of the six sides that form the hexagon shaped drum 72. Each stripping element 66 extends radially outward and is angled forward in the direction of rotation indicated by arrow 74. Tapered slots 76 are formed in each stripping element 66. The slots 76, as shown in FIG. 2, have a key-hole shape with a circular aperture 78 at the base and a V-shaped portion that extends radially outward and increases in width from the circular aperture. A point 80 is formed on the radially outward edge of the stripping elements 64 between each pair of slots 76.

Figure 3:
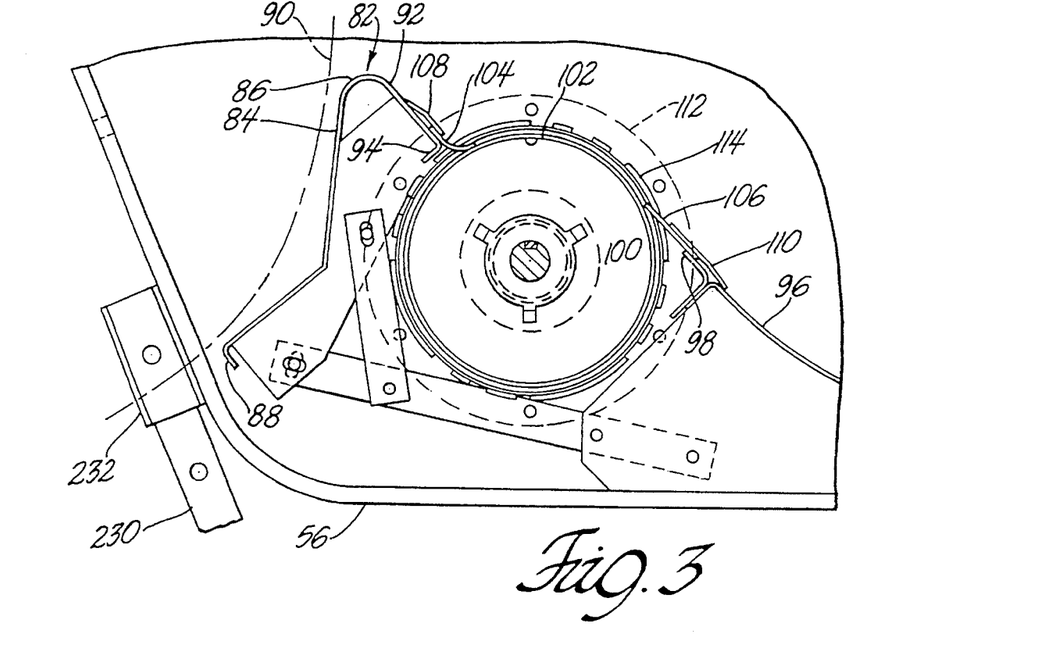
FIG. 3 is an enlarged vertical cross sectional view of one end of the roller, the feed plate and a portion of the right end sheet assembly.

The forward portion 84 of the anti-windage feed plate 82 has an upper tip 86 and a lower tip 88 that are close to the path of movement 90 of the points 80 of the stripping elements 66 as shown in FIG. 3 and described above. The surfaces of the anti-windage feed plate 82 between the upper tip 86 and the lower tip 88 are recessed away from the path of movement 90. This construction substantially reduces the quantity of air that is moved by the stripping rotor 64 toward the auger trough 50. If too much air is moved to the rear by the stripping rotor 64, it tends to blow dust upwardly through the screens 168 described below and obscures the operator's vision from the cab 30.

A combination air control and formed feed plate 82, as shown in FIG. 3, is rigidly secured to the left and right end sheet assemblies 54 and 56 and the auger trough 50 to the rear of the stripping rotor 64. The feed plate 82 includes a forward position 84 with an upper radiused cut-off tip 86 and a lower tip 88 that are both slightly to the rear of the path of movement 90, of the points 80 of the stripper plates 66. An upper part 92 of the forward portion 84 of the feed plate 82 extends rearwardly and downwardly from the upper tip 86 to a forward slot edge 94. The rear portion 96 of the feed plate 82 extends rearwardly from the rear slot edge 98 to the auger trough 50. The rear portion 96 of the feed plate 82 and the auger trough 50 are formed from one metal sheet. The forward slot edge 94 and the rear slot edge 98 of the feed plate 82 form a relatively narrow slot 100 that extends from the left end sheet assembly 54 to the right end sheet assembly 56.

A smooth roller 102 is rotatably journaled in the left end sheet assembly 54 and the right end sheet assembly 56 below the slot 100. The roller 102, which is larger in diameter than the width of the slot 100 has an upper portion that extends into the slot and essentially closes the slot from the left end sheet assembly 54 to the right end sheet assembly 56. A front flexible sealing strip 104 is attached to the forward slot edge 94 and rubs against the roller 102 to prevent the passage of grain between the roller and the forward slot edge and thereby prevent grain loss. A rear flexible sealing strip 106 is attached to the rear slot edge 98 and rubs against the roller 102 to prevent the passage of grain between the roller and the rear slot edge and thereby prevent grain loss. Metal plates 108 and 110 clamp the flexible sealing strips 104 and 106 to the feed plate 82 and facilitate replacement of worn flexible sealing strips. A ring 112 with a cylindrical axial extending flange 114 is bolted to each end sheet assembly 54 and 56. The axially extending flanges 114 of the rings 112 telescopically receive the ends of the roller 102 and prevent crop material from entering the space between the ends of the roller and the end sheet assemblies 54 and 56 to prevent loss of grain and possible damage to the bearings that support the roller.

An auger 116 is rotatably journaled on pie shaped mounting plates 118 attached to each end sheet assembly 54 and 56. The auger 116 has a center tube 117, flighting 132 attached to the center tube and support shafts 119 extending from the ends of the center tube. The pie shaped mounting plates 118 are each pivotable about a fixed pin 120. Slots 122 in the pie shaped plates 118 permit fore and aft adjustment of the auger 116. An adjustment bolt 124 that passes through a flange 126 welded to each pie shaped mounting plate 118, provides fore and aft adjustment of each pie shaped mounting plate relative to the fixed pin 120. A stop adjustment screw 128 passes through a flange 130 welded to the outside surface of each of the end sheet assemblies 54 and 56. The adjustment bolts 124 and the stop adjustment screws 128 provide adjustment of the clearance between the auger flighting 132 and the upper surface of the auger trough 50 and the fore and aft position of the auger 116 within the auger trough. The pie shaped mounting plates 118 can pivot upwardly about the axis of the fixed pins 120 when large quantities of crop material or foreign objects enter the auger trough 50 and lift the auger 116. A fixed stop 134, shown in FIG. 6, is attached to each end sheet assembly 54 and 56 limits upward pivotal movement of the pie shaped mounting plates 118. Retainer plates 136 bolted to the end sheet assemblies 54 and 56 limit lateral movement of the pie shaped mounting plates 118 while leaving the pie shaped mounting plates free to pivot about the fixed pins 120.

Figure 8:
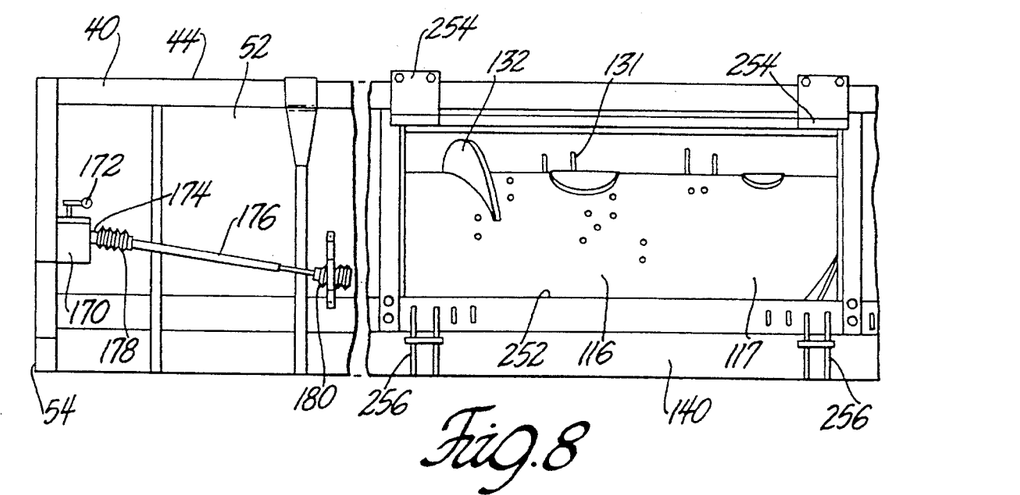
FIG. 8 is a rear perspective view of the left end of the stripper header attachment.

The flighting 132 on the left end of the auger 116 conveys crop material to the right. The flighting 132 on the right end of the auger 116 conveys crop material to the left. Retractable fingers 131, shown in FIG. 8, are provided in the center portion of the auger 116 to feed crop material through the discharge opening 252 in the rear wall 52 of the stripper header attachment 10.

Figure 4:
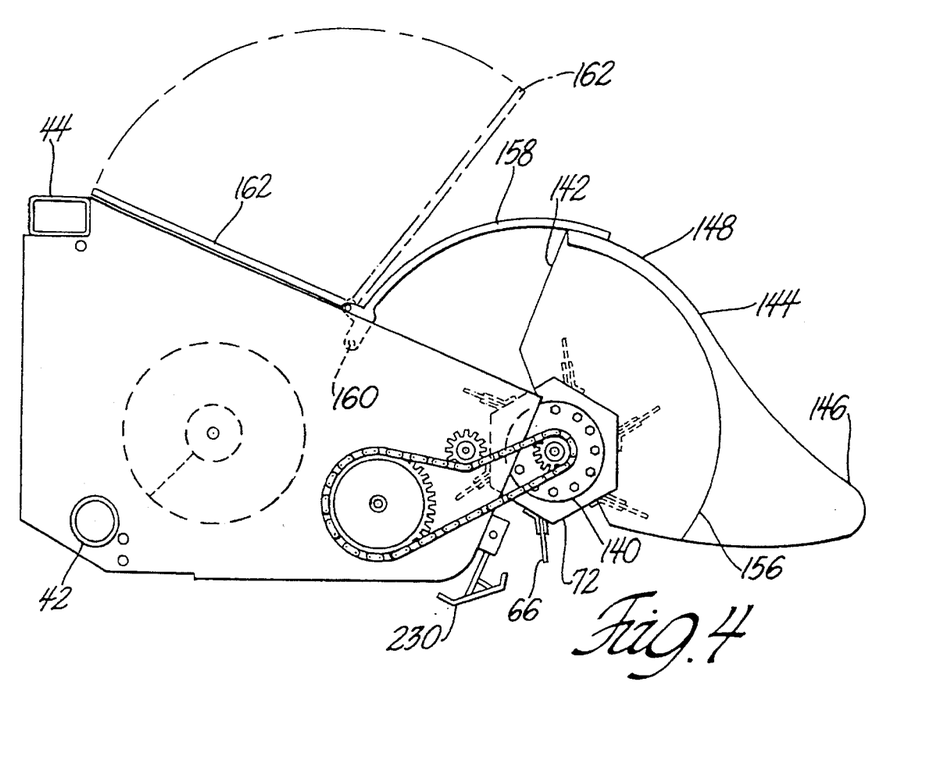
FIG. 4 is a side elevational view of the right side of the stripper header attachment showing the open position of the auger housing cover.
Figure 7:
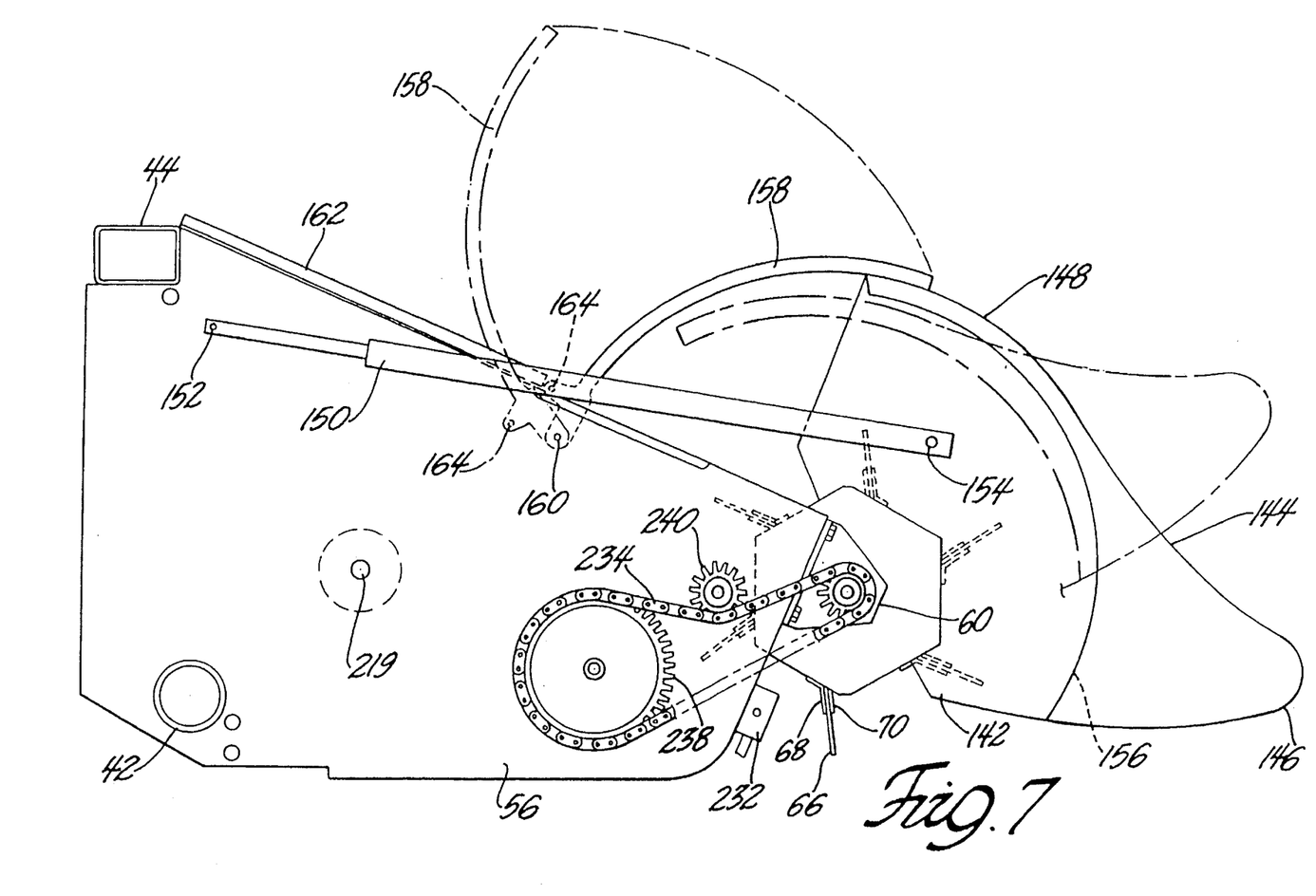
FIG. 7 is an enlarged right side elevational view showing the front and rear hood.

A disk 140, shown in FIG. 4, is rotatably journaled on each end of the stripping rotor 64. The disks 140 are positioned between the bearing block 58 and 60 and the hexagon shaped drum 72. End plates 142 of a front hood 144 are bolted to the disks 140. The front hood 144 has a curved nose portion 146 and an arcuate portion 148 with a fixed radius that is non-eccentric with the axis of rotation of the stripping rotor 64 and the disks 140. The nose portion 146 and the arcuate portion 148 both extend substantially the full width of the stripper header attachment 10 and from the left end sheet assembly 54 to the right end sheet assembly 56. A hydraulic hood adjustment cylinder 150, shown in FIG. 7, is pivotally attached to the right end sheet assembly 56 by a pin 152 and to the end plate 142 of the front hood 144 by a pin 154. The hydraulic hood adjustment cylinder 150 adjusts the heights of the nose portion 146 by pivoting the entire front hood 144 and the disks 140 about the axis of rotation of the stripping rotor 64. Only one hood adjustment cylinder 150 is used. However, if desired, a hood adjustment cylinder 150 could be employed at each side of the front hood 144. An arcuate liner 156 is provided on an inside portion of the front hood to guide and direct heads and grain stripped by the stripping rotor 64 toward the auger 116. A rear hood 158 has its rear portion pivotally attached to the left and right end sheet assemblies 54 and 56 by pivot pins 160. The rear hood 158 is arcuate and has a common radius. The forward portion of the rear hood 158 contacts the upper surface of the arcuate portion 148 of the front hood 144. A sliding seal is created by contact between the front hood 144 and the rear hood 158. The sliding seal prevents the passage of air and the loss of heads and grain between the front hood 144 and the rear hood 158 and permits pivotal movement of the front hood by the hood adjustment cylinder 150 to adjust the height of the curved nose portion 146. The rear hood 158 can be pivoted about the pivot pins 160 away from the front hood 144 to gain access to the top of the stripping rotor 64 as shown in FIG. 7 for inspection and maintenance.

Figure 9:
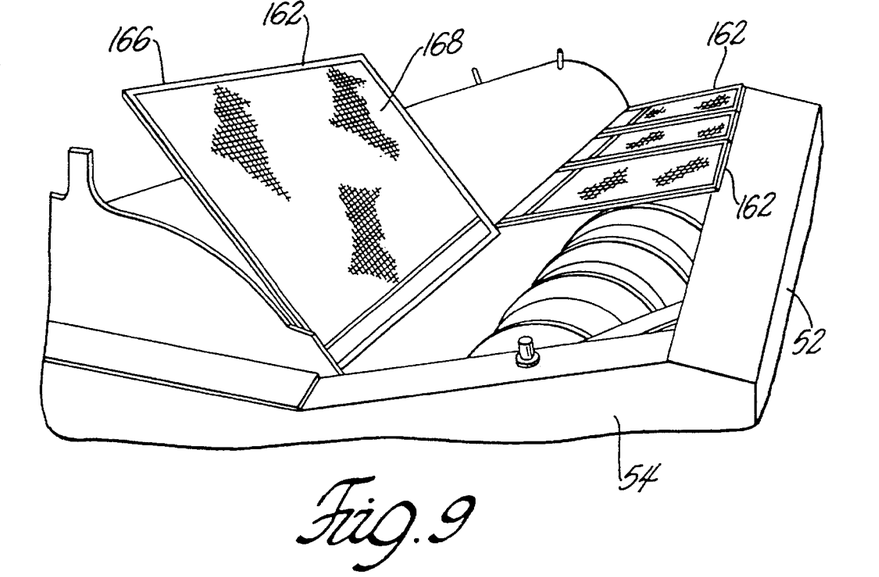
FIG. 9 is a perspective view of the auger housing cover.

Several auger housing covers 162 are pivotally attached to the rear of the rear hood 158 by screen pivot pins 164. Each of the auger housing covers 162 includes a rectangular frame 166 and a screen 168 secured to the rectangular frame. During operation of the stripping header attachment 10 the rear portion of each auger housing cover 162 rests on the top of the upper beam 44 of the frame 40. In this portion the auger housing covers 162 completely cover the auger 116 and the auger trough 50. The screens 168 permit the passage of air and prevents grain and heads from being thrown from the top of the auger trough 50 by the striper rotor 64. The operator of a combine harvester 12 with the stripper header attachment 10 can see through the screens 168 to visually monitor operation of the stripper header. Each auger housing cover 162 can be pivoted upwardly and forward about the axis of the screen pivot pins 164 to provide access to the auger 116 and auger trough 50 for inspection, maintenance or unplugging.

Combine harvesters 12 have mechanical drives or hydraulic drives that transmit torque from an engine in the engine compartment 34 to the various harvesting, threshing, separating and cleaning assemblies. Most combine harvesters 12 have a driven shaft (not shown) on the forward end of the feeder elevator housing 20. This shaft on the forward end of the feeder elevator housing 20 usually drives the header attachment. Hydraulic drives are also employed to drive header attachments.

The stripper header 10 described above has a three speed gear box 170 with a gear ratio selector lever 172. The three speed gear box 170 is bolted to the rear side of the frame 40 adjacent to an inside surface of the left end sheet assembly 54. An input shaft 174 in the three speed gear box 170 is attached to and driven by one end of a drive shaft 176. The other end of the drive shaft 176 is connected to and driven by a driven shaft on the forward end of the feeder elevator housing 20. As shown, the ends of the drive shaft 176 have universal joints 178 and 180 that accommodate misalignment between the input shaft 174 and the driven shaft on the elevator housing 20. The input shaft 174 and a lower output shaft 182 both extend through the left end sheet assembly 54 and outwardly past the left end sheet 54.

A sprocket 184 is mounted on the end of the input shaft 174, of the three speed gear box 170, that extends through the left end sheet 54. A sprocket 186 is mounted on the end of the support shaft 119 of the auger 116 and is held on the auger by a threaded cap screw 188. An endless roller chain 190 is trained around the sprocket 184 on the gear box input shaft 174 and the sprocket 186 on the auger 116. An adjustable idler sprocket 192 is mounted on the left end sheet assembly 54 and adjusts the tension on the roller chain 190 when the auger 116 is resting on the stop adjustment screws 128. The drive described above drives the auger 116 at a generally constant speed regardless of the three speed gear box 170 gear ratio selected by the ratio selector lever 172. A change in the rotation speed of the auger 116 if required would normally be obtained by changing the diameter of the sprocket 184 or the sprocket 186.

A four groove V-belt pulley 194 is mounted on the lower output shaft 182 of the three speed gear box 170. The V-belt pulley 194 is positioned outboard of the sprocket 184 to clear the endless roller chain 190. A driven V-belt pulley 196 is mounted on the left end of the stripping rotor 64 support shaft 198. An endless 4 band V-belt 200 is trained around the V-belt pulley 194 on the lower output shaft 182 of the three gear box 170 and the driven V-belt pulley 196 on the stripping rotor 64. A V-belt tensioning system is provided to maintain tension on V-belt 200. The tensioning system includes a fixed idler pulley 202 Journaled on a shaft 204 attached to the left end sheet assembly 54. The fixed idler pulley 202 engages an inside surface of the V-belt 200. A spring biased idler pulley 206 is journaled on a shaft 208. The shaft 208 is connected to the shaft 204 by a fixed length arm 210. The fixed length arms 210 permit the spring biased idler pulley 206 to move along an arc about the axis of the shaft 204. A pair of arms 212 have their lower ends connected to the shaft 208. A rod 214 is pivotally attached to the upper ends of the arms 212 by a threaded shaft 216 in one of four adjustment bores 218. The rod 214 extends upwardly from the arms 212 in an aperture in the bottom of a u-shaped member 220 attached to the left end sheet assembly 54 by a pair of angle members 222 and 224. The rod 214 extends upwardly through two bushings and a compression spring 226. A hexagonal cap 228 welded on the top end of the rod 214 contacts the top of the top bushing which contacts the top of the compression spring 226. The compression spring 226 biases the idler pulley 206 upwardly into contact with the outer surface of the V-belt 200 to tension the V-belt. V-belt 200 tension can be adjusted by changing the position of the rod 214. If a large adjustment is required, the shaft 216 may be moved to a different adjustment bore 218 through the arms 212. The V-belt 200 must transmit substantial torque to rotate the stripping rotor 64. To transmit the required torque, the V-belt 200 preferably engages a plurality of v-grooves in each pulley 194 and 196. The stripping rotor 64 is driven at about 400, 500 or 600 revolutions per minute by the three speed gear box 170 when the input shaft 174 is driven at 500 R.P.M. The speed at which the stripping rotor 64 is to be driven depends primarily upon stripping rotor 64 diameter and crop conditions. Ground speed of the combine harvester 12 can also change the rotation speed requirements for the stripping rotor 64.

The smooth roller 102 is driven by a continuous roller chain 234 trained around a drive sprocket 236 mounted on the right end of the stripping rotor 64 and a sprocket 238 mounted on the right end of the smooth roller 102. An adjustable idler sprocket 240 is clamped to a slotted adjustment bracket 242 on an outboard surface of the right end sheet assembly 56. The adjustable idler sprocket 240 is in engagement with the roller chain 234 and is positioned in the slotted adjustment bracket 242 to provides proper roller chain tension. Adjustable parking stands 230 are telescopically mounted in a mounting bracket 232 on the lower leading edge of the left and right end sheet assemblies 54 and 56. The adjustable stands 230 function as parking stands when the stripper header attachment 10 is not in use. The stripping elements 66, which are preferably made from a strong high density plastic material can be damaged if they harshly contact the ground.

During operation of the stripper header attachment 10, the header attachment is connected to the elevator housing 20 of a combine harvester 12. The connection includes connecting the hydraulic hood adjustment cylinder 150 to the combine harvester 12 hydraulic system and connecting the drive shaft 176 to a driven shaft on the feeder elevator housing 20. The proper gear ratio in the three speed gear box 170 is selected. The hydraulic cylinders 24 are extended or retracted as required to position the stripping rotor 64 at the proper height for the crop that is to be harvested. The hydraulic hood adjustment cylinder 150 is extended or retracted to position the nose portion 146 of the front hood 144 at the desired height relative to the standing crop. Normally the nose portion 146 of the front hood 144 should engage the top four inches or so of the crop to orient the stalks or straw slightly away from the stripping rotor 64. The drive to the gear box 170 is then engaged and the combine harvester 12 moves forward through the field.

The stalks or straw enters the slots 76 in the stripping elements 64 and the rotating stripping elements strip grain and heads from the stalks or straw and leave the stalks or straw attached to their roots and the ground. The stripping rotor 64 rotates in the direction indicated by arrow 74 and releases the heads and loose grain that has been detached from the plant upward and rearwardly toward the front hood 144 and the rear hood 158. The radially outer tips or points 80 on the stripping elements follow a path of movement 90 shown in FIG. 3 that is close to the forward portion 84 of the feed plate 82. The upper tip 86 of the feed plate 82 directs heads and grain away from the stripping rotor 64. Upwardly and rearwardly facing surfaces of the feed plate 82 that extend from the upper tip 86 to the auger trough 50 carry heads and grain as the heads and grain slide toward the auger trough. Heads, kernels, and other plant material usually slide well but may tend to stick on the feed plate 82 depending upon moisture content of the heads and other characteristics of the heads and plant material. The smooth roller 102 is mounted in the slot 100 and driven in the same direction as the stripping rotor 64 to convey heads, grain and other crop material on the feed plate 82 toward the auger trough 50.

The auger 116, which rotates in the opposite direction from the stripping rotor 64 as indicated by the arrow 250, shown in FIG. 5, conveys heads and grain along the auger trough 50 away from both end sheet assemblies 54 and 56 and toward the center of the auger trough. Upon reaching an area substantially mid way between the left and right end sheet assemblies 54 and 56, the auger discharges heads, grain and any other crop material in the auger trough through a discharge opening 252 in the rear wall 52 of the stripper header attachment 10. Heads, grain and other crop material that passes through the discharge opening 252, is received by the feeder elevator housing 20. The conveyor 22 conveys crop material received in the elevator housing 20 to the threshing separating and cleaning mechanisms.

Figure 10:
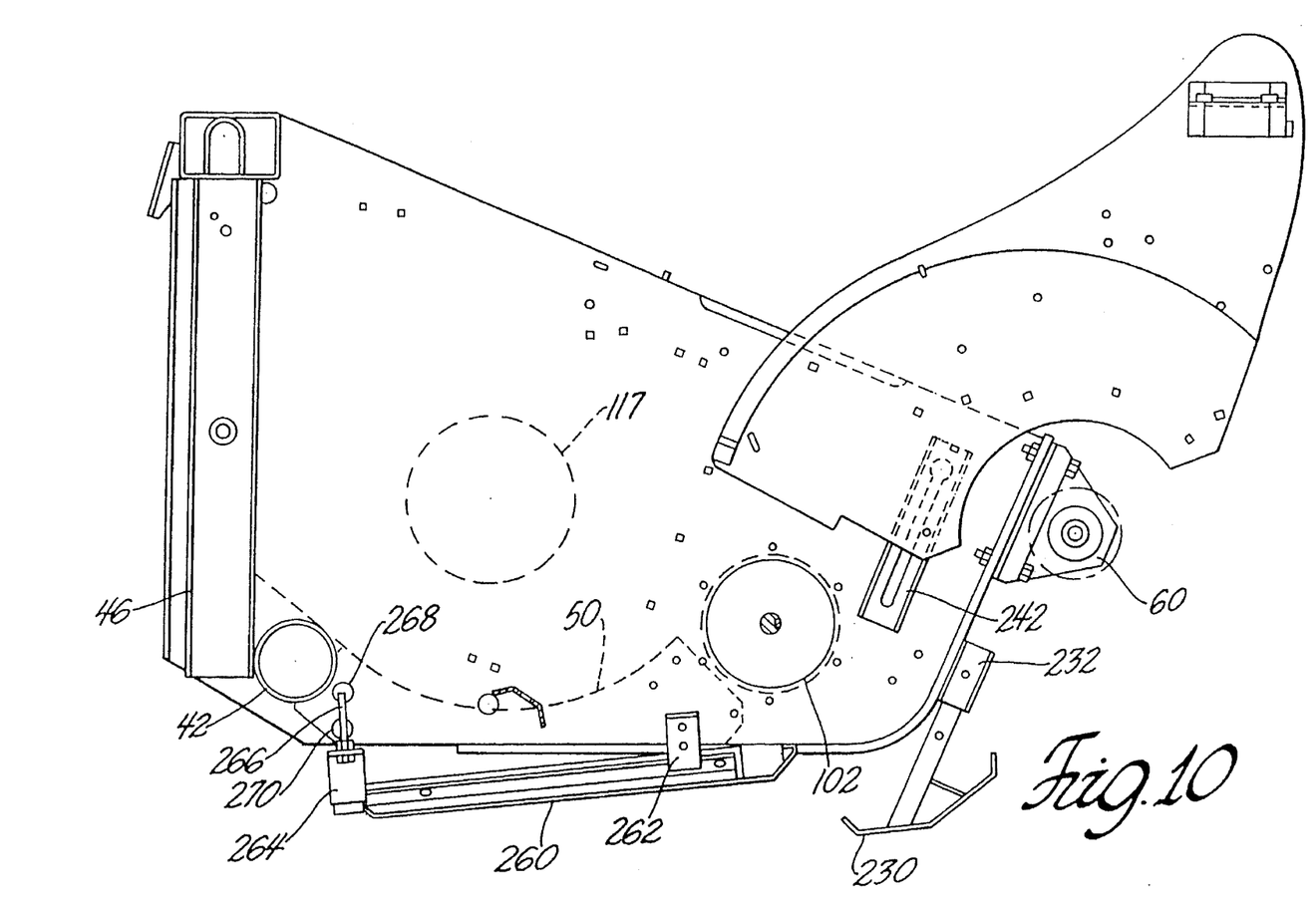
FIG. 10 is an enlarged right side elevational view with drives removed and with the front and rear hood removed and with adjustable skid plates shown.

Adjustable skid plates 260 are mounted on the bottom of the frame 40 below the auger trough 50. The skid plates 260 could be a single plate that extends the width of the stripper header attachment. However it is preferable to employ several individual skid plates 260 that cooperate to form a continuous cover for the bottom of the auger trough 50. The skid plates 260, as shown in FIG. 10, are trays with front mounting brackets 262 and rear mounting brackets 264. The front mounting brackets 262 are secured to the skid plates 260 and are bolted to ribs 48. Multiple apertures are provided so that the front mounting brackets 262 can be attached to the ribs 48 in at least two vertically spaced positions. The rear mounting brackets 264 are fixed to the skid plates 260. Adjustment screws 266 connect the rear mounting brackets 264 to the ribs 48. The adjustment screws 266 can be attached to the ribs 48 in an upper position 268 or a lower position 270. The adjustment screws 266 can be rotated to obtain infinite adjustment over a range of positions. The ski plates 260 are normally adjusted to provide approximately two inches clearance between the stripping elements 66 and the ground when the skid plates 260 are sitting on the ground. The relatively wide range of vertical adjustment of the feed plates 260 is required to accommodate different combine harvesters 12.

Covers for the drives on the stripper header attachment 10 are not shown in the drawing so that working parts can be seen. Covers are provided however to protect the drive from the elements and material that could affect the stripper header 10 operation. Covers also provide protection for persons near the drives.

Attachment members 254 and 256 are provided on the frame 40 that are compatible with the elevator housing 20 of the combine harvester 12 to which the stripper header attachment 10 is to be mounted. Dividers for dividing crop material are available but not shown. Dividers which are occasionally used are attached to the front hood 144.

The preferred embodiment of the invention has been described in detail but is an example only and the invention is not restricted thereto. It will be easily understood by those skilled in the art that modifications and variations can easily be made within the scope of this invention.

We claim:

1. A stripper header attachment, adapted to be attached to a combine harvester, having an elongated frame with a back wall, a right side sheet and a left side sheet;

a stripping rotor rotatably journaled on the forward portion of the right side sheet and the forward portion of the left side sheet for rotation about a generally horizontal transverse axis;

stripping elements attached to the outer surface of the stripping rotor;

a front hood mounted on the right side sheet and the left side sheet and covering a part of an upper and forward portion of the stripping rotor;

an auger trough mounted on the frame and extending from the right side sheet to the left side sheet;

an auger conveyor rotatably journaled on the right side sheet and the left side sheet positioned in the auger trough and extending from the right side sheet to the left side sheet;

a feed plate mounted on the frame and extending from a position adjacent to the stripping rotor to the auger trough and from the right side sheet to the left side sheet;

a slot in the feed plate extending substantially from the right side sheet to the left side sheet and having a predetermined width;

a smooth roller conveyor rotatably journaled on the right side sheet and the left side sheet, that has a diameter which exceeds the predetermined width of the slot and an upper portion that extends into the slot a sufficient distance to substantially prevent the passage of grain through the slot; and a drive system that rotates the stripping rotor in a direction to move stripped heads and grain over the top of the stripping rotor, that rotates the smooth roller conveyor in the same direction as the stripping rotor to convey stripped heads and grain toward the auger trough, and that rotates the auger conveyor in the opposite direction from the stripping rotor.

2. A stripper header attachment, as set forth in claim 1, wherein the drive system that drives the stripping rotor, the smooth roller conveyor and the auger conveyor includes a multi ratio gear box adapted to be driven by a combine harvester, a first output drive that drives the auger conveyor in a first direction and a second output drive that drives the stripping rotor in a second direction through a selected one of a plurality of drive ratio.

3. A stripper header attachment, as set forth in claim 2, wherein the multi ratio gear box has three different drive ratios.

4. A stripper header attachment, as set forth in claim 2, wherein torque is transmitted from the multi ratio gear box to the stripping rotor includes an endless belt and a spring biased idler pulley supported by one of the end sheets that engages and tensions the endless belt.

5. A stripper header attachment, as set forth in claim 4, further including a fixed idler pulley mounted on one of the end sheets and in engagement with the endless belt.

6. A stripper header attachment, as set forth in claim 1, including a rear hood pivotally attached to the right and left side sheets and in sealing contact with the front hood.

7. A stripper header attachment, as set forth in claim 1, including an auger conveyor and auger trough cover supported by the elongated frame.

8. A stripper header attachment, as set forth in claim 6, including an auger conveyor and auger trough cover pivotally attached to the rear hood.

9. A stripper header attachment, as set forth in claim 1, including an adjustable skid attached to the right side sheet and an adjustable skid attached to the left side sheet which extends below the power portion of the stripping rotor to hold the stripping rotor above the ground.

10. A stripper header attachment, as set forth in claim 1, wherein the drive system includes a smooth roller conveyor drive sprocket mounted on the stripper rotor, a smooth roller driven sprocket mounted on the smooth roller conveyor and a smooth roller endless drive chain trained around the smooth roller conveyor drive sprocket and the smooth roller driven sprocket.

11. A stripper header attachment, as set forth in claim 1, wherein the smooth roller conveyor includes a front seal mounted on feed plate on the front side of the slot and in contact with the smooth roller conveyor and a rear seal mounted on the feed plate on the rear side of the slot and in contact with the smooth roller conveyor.

* * * * *